Patented Oct. 6, 1931

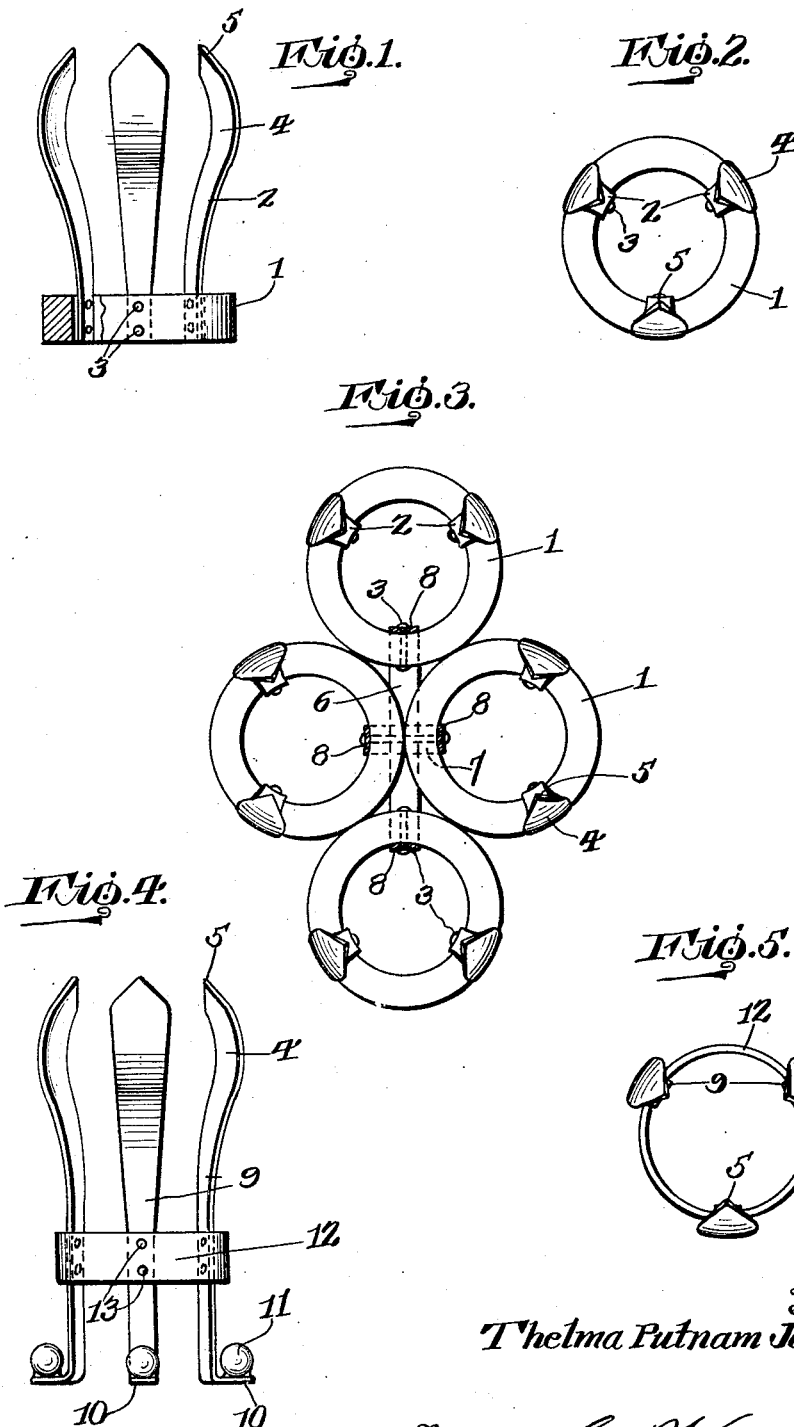

1,826,547

UNITED STATES PATENT OFFICE

THELMA PUTNAM JACKSON, OF HOUSTON, TEXAS

FLOWER BULB CONTAINER

Application filed June 14, 1930. Serial No. 461,135.

This invention relates to a flower bulb holder, and has for its primary object to provide, in a manner as hereinafter set forth, a holder of such class which is adapted to be disposed within a water container for the purpose of lightly gripping a flower bulb to maintain the same in an upright position while growing.

A further object of the invention is to provide a holder for lightly gripping a flower bulb within a water container in such a manner that the roots of the bulb may freely grow downwardly and around the interior of the container, thereby facilitating the growth of the flower and providing for the close observance of such growth by any one interested in the study of growing plants.

With the foregoing and other objects in view, the invention consists of the novel construction, combination and arrangement of parts as hereinafter more particularly described, and as illustrated in the accompanying drawings wherein are shown embodiments of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is an elevation of a bulb holder in accordance with this invention, the same being partly broken away to show the cross sectional shape of the base and supporting member.

Figure 2 is a top plan thereof.

Figure 3 is a sectional plan of a flower bulb cluster holder.

Figure 4 is an elevation of a modified form of the invention.

Figure 5 is a top plan of the embodiment shown in Figure 4.

Referring to the drawings in detail, the numeral 1 designates a combined base and supporting member which is in the form of an annular ring rectangular in cross section. The wall of the member 1 is of greater thickness axially thereof than radially thereof. Secured to the inner peripheral face of the member 1 are a plurality of resilient fingers 2 arrange in equi-spaced relation circumferentially of the member 1. The fingers 2 have their lower ends secured to the member 1 by means of suitable rivets 3.

Upper end portions of the fingers 2 are formed with outwardly directed arcs 4 in order that such portions may conform with the contour of a flower bulb when the latter is inserted between the fingers. The arc portions 4 terminate at their free upper ends in tapered portions 5. Each of the fingers 2 gradually increases in width from the lower end thereof to the base line of the tapered upper end portion 5 in order to provide the arc portions 4 with relatively wide bearing surfaces for engagement with the flower bulb in order that the latter may be gripped without injury thereto.

In Figure 3 a plurality of the base and supporting members 1 are arranged in a cluster and secured in their relative positions by means of straps 6 and 7, each of which extends beneath the wall of a pair of the members 1 and terminates at its outer end in a finger 8 similar to the fingers 2 heretofore described. The finger 8 of each of the members 1 is arranged in equi-spaced relation to a pair of the fingers 2. Each of the fingers 8 is secured to a base and supporting member 1 by means of a rivet 3.

The holder illustrated in Figures 4 and 5 consists of a plurality of fingers 9 which are of materially greater length than the fingers 2 and which terminate at their lower ends in outwardly directed, right angularly disposed portions 10 which provide bases for the fingers 9. Adjacent the outer ends thereof, the bases 10 are provided with weights 11 which tend to normally maintain the bases in flat position. In spaced relation to the bases 10, the fingers 9 are secured to an annular supporting ring 12 which maintains the fingers in assembled relation. The fingers 9 are extended through the supporting ring 12 and are secured against the inner peripheral face of the latter by means of a plurality of rivets 13. The wall of the supporting ring 12 is of substantially the same radial thickness as the thickness of each of the fingers 9. The portions of the fingers 9 which project above the ring 12 are of the same shape as the fingers 2 described in connection with Figure 1.

It is thought that the many advantages of a flower bulb holder in accordance with this invention will be readily apparent, and although the holder will preferably be constructed in accordance with the embodiments herein illustrated and described, it is to be understood that changes in the details of construction may be resorted to, so long as such changes fall within the scope of the invention as defined in the appended claims.

It is particularly pointed out, that, while the cluster shown in Figure 3 is composed of a plurality of elements such as shown in Figure 1, the cluster may be formed of a plurality of elements such as shown in Figure 4, or differing from either of the elements shown in Figures 1 and 4 respectively.

What I claim is:

1. A flower bulb cluster holder comprising, a plurality of annular elements positioned in side opposed relation, and a plurality of resilient fingers secured to and extending upwardly from the inner peripheral face of each element, certain of said fingers being in opposed position and having their lower portions extended beneath the elements and integrally connected to secure the elements together in a cluster.

2. A flower bulb cluster holder comprising, a plurality of annular elements positioned in side opposed relation, and a plurality of resilient fingers secured to and extending upwardly from the inner peripheral face of each element, certain of said fingers being in opposed position and having their lower portions extended beneath the elements and integrally connected to secure the elements together in a cluster, the wall of each of said annular elements being rectangular in cross section.

In testimony whereof, I affix my signature hereto.

Mrs. THELMA PUTNAM JACKSON.